United States Patent

[11] 3,598,434

| [72] | Inventors | De Lane D. Patton<br>Keiser;<br>William J. Worthington, Maughan; B.<br>Garth, Columbus, all of, Ohio |
|---|---|---|
| [21] | Appl. No. | 44,304 |
| [22] | Filed | June 8, 1970 |
| [45] | Patented | Aug. 10, 1971 |
| [73] | Assignee | Columbus Auto Parts Company<br>Columbus, Ohio |

[54] BALL JOINT HAVING DISPOSABLE RETAINER
8 Claims, 5 Drawing Figs.

[52] U.S. Cl. .................................................. 287/87,
138/96
[51] Int. Cl. ...................................................... F16c 11/06
[50] Field of Search ............................................ 138/96 T,
96; 287/90 R, 90 C, 87; 174/138 F

[56] References Cited
UNITED STATES PATENTS
| 3,104,681 | 9/1963 | Gray, Jr. ........................ | 138/96 |
| 3,199,902 | 8/1965 | Fierstine ........................ | 287/87 |

Primary Examiner—David J. Williamowsky
Assistant Examiner—Andrew V. Kundrat
Attorney—Harness, Dickey & Pierce ABSTRACT: A ball joint for an automotive-steering linkage or the like which is assembled prior to its installation on a vehicle with a special plastic retainer sleeved over the ball stud. The retainer protects the threads of the stud and holds the usual dust cover in place. The retainer is removed and discarded upon the installation of the ball joint onto the vehicle. The retainer has the shape of a tapered open-ended sleeve with internal ribs to grip the stud threads. The retainer is slotted at its opposite ends an has integral hinge portions between the slots so that the application of radial forces at one end of the retainer will produce opposite radial movement of the opposite end of the retainer.

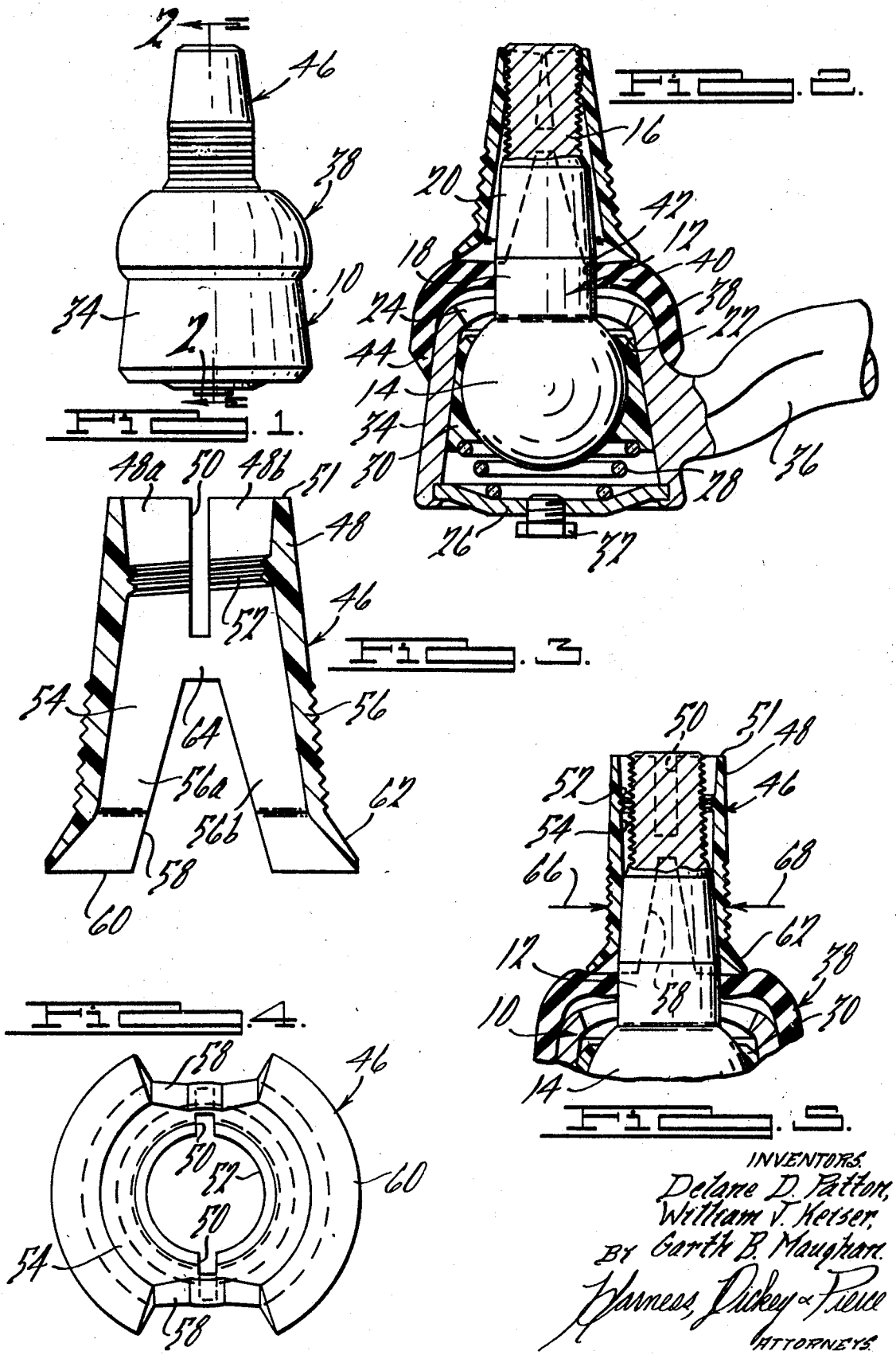

BALL JOINT HAVING DISPOSABLE RETAINER

SUMMARY OF THE INVENTION

It has been normal automotive practice to ship ball joints to automobile assembly plants with a nut and cardboard ferrule or sleeve fitted on the ball stud. The cardboard ferrule is located between the nut and dust cover. The ferrule protects the threads of the stud and holds the dust cover in place. This nut-ferrule combination has several important drawbacks. The double-installation of the nut (first during assembly of the ball joint and second during installation of the ball joint on the vehicle) is inconvenient and in the case of certain new nuts quite undesirable. When prevailing torque locknuts or special crimped nuts are used, damage to the ball stud threads or the nut itself can result from the removal and reinstallation of the nut. In fact, some nuts or nutlike fasteners are designed to be used only once. Furthermore the cardboard ferrule does not adequately hold the dust cover in place during the greasing of the joint. Ball joints are normally greased upon the initial assembly thereof and it has been found that cardboard ferrules do not adequately support the dust cover to prevent the escape of grease past the dust seal, during greasing. Excess grease creates a serious cleanup problem, to say nothing of the cost of the wasted grease.

The ball joint of the present invention is designed to provide protection for the stud threads during shipment of the joint and to provide for positive retention of the dust cover in its proper place on the joint. The retainer used in the joint is of a relatively inexpensive construction which may be conveniently discarded after the installation of the ball joint onto the vehicle. It is therefore an object of the present invention to provide a ball joint having a combined dust cover retainer and thread protector which is inexpensive to manufacture, convenient to use, reliable in performance, adequately reinforces the dust cover against the escape of grease during the greasing of the joint and is easy to remove from the joint.

DESCRIPTION OF THE VIEWS OF THE DRAWINGS

FIG. 1 is an elevational view of a ball joint incorporating the features of the present invention;

FIG. 2 is an enlarged sectional view of the structure illustrated in FIG. 1 taken along the line 2-2 thereof;

FIG. 3 is an enlarged sectional view of the retainer shown in FIGS. 1 and 2;

FIG. 4 is a bottom plan view of the retainer shown in FIG. 3; and

FIG. 5 is a sectional view similar to FIG. 4 but with the retainer shown in the position it assumes when the lower end of the retainer is squeezed preparatory to its removal from the joint.

DESCRIPTION OF THE ILLUSTRATED EMBODIMENT

The ball joint of the present invention includes a socket member 10 and a ball stud 12. The ball stud 12 has a segmentally spherical head 14 at one end thereof and threads 16 at its opposite end. A straight cylindrical portion 18 of the stud 12 lies adjacent the head 14. Located between the cylindrical portion 18 and the threads 16 is a tapered stud portion 20. The stud head 14 is disposed within a cavity 22 of the socket member 10 while the straight cylindrical portion 18 projects through an opening 24 formed in one end of the cavity. The bottom of the cavity 22 is closed by a plate 26 forming a seat for a spring 28 that acts against a split plastic bushing 30. The wall of the cavity 22 is frustoconical so that the force of the spring 28 against the bushing 30 forces it radially inwardly into gripping relationship with the ball head 14. A grease fitting 32 is fitted in the plate 26 while the socket member 10 has a frustoconical outer sidewall 34 and an arm 36 which projects from one side of the wall 34.

The ball joint of the present invention includes an elastomeric dust cover 38 which is designed to provide a seal between the ball stud 12 and the outer wall 34 of the socket member 10. The dust cover 38 is of generally inverted cup-shape and includes an annular wall 40 having a central opening 42 and a generally cylindrical wall 44 merging with the outer periphery of the wall 40. The cylindrical wall 44 makes contact with the outer wall 34 of the socket member 10 while the annular wall 40 makes contact with the cylindrical stud portion 18 at the wall of the opening 42 thereof. When the ball stud 12 pivots or oscillates about the center of its head 14 the dust cover will slide over the wall 34 while maintaining the desired seal with the socket member 10.

Fitted over the stud 12 in a location outwardly of the dust seal 38 is a combination dust cover retainer and thread protector 46. For sake of convenience the member 46 will be referred to as the "retainer." The retainer 46 possesses a generally tapered sleeve-shaped configuration, is open at its opposite ends and is slotted as will be more fully described. The retainer includes a first end portion 48 which is divided into diametrically opposed halves 48a and 48b by a pair of slots 50 extending inwardly from the outer end 51 thereof. The first end portion 48 provides a plurality of radially inwardly projecting ribs 52 which are in the form of a thread that is continuous over both of the halves 48a and 48b. The thread 52 projects inwardly from the inner peripheral surface 54 of the retainer 46. The opposite end of the retainer has what may be termed a second end portion 56 which is likewise divided into two halves 56a and 56b. The halves 56a and 56b are separated by a pair of slots 58 extending inwardly from the inner end 60 of the retainer 46. The inner end 60 is formed on what may be termed as an outwardly flared skirt 62 of the second end portion 56. It will be noted that the slots 58 are somewhat wider than the slots 50. Disposed between the slots 50 and 58 are a pair of hinges 64 which comprise integral portions of the retainer 46. The hinges 64 will bend to permit the opposite halves 48a and 48b to move toward and away from one another upon the application of radial forces to the opposite halves 56a and 56b of the second end portion 56. Thus, when the second end portion 56 is squeezed by the application of forces in the direction of the arrows 66 and 68 (FIG. 5), first end halves 48a and 48b will move away from one another and the ribs 52 will expand away from the stud threads 16.

The retainer 46 is preferably made as a unitary plastic molding from a resilient resinous material such as polyethylene. The wall thickness of the retainer 46 is sufficient that the various portions of the retainer are self-supporting and will not suffer from undesired bending. The material does possess sufficient resiliency, however, to enable the hinges 64 to bend as desired.

Due to the frustoconical shape of the retainer 46 and its skirt 62, the force exerted on the retainer by the dust cover 38 when the joint is fully greased tends to spread the second portion halves 58a and 58b apart. This tends to move the first portion halves 48a and 48b toward one another. Thus, the ribs 52 grip the stud 12 with even greater force to prevent longitudinal movement of the retainer 46 on the stud. It will be understood, of course, that the normal pitch diameter of the ribs 52 is slightly less than the pitch diameter of the stud threads 16. Accordingly the elastic memory of the material also helps to hold the retainer in place.

The installation of the retainer 46 on the joint is accomplished in a highly convenient manner. The retainer is the last component of the assembly to be installed and is simply positioned over the stud 12 until the end of the threads 16 engage the inner periphery 54 of the retainer. The retainer is then pushed the rest of the way to the position illustrated in FIG. 2 with the palm of the hand. The stud cams the first end portion halves 48a and 48b to permit the stud to pass between them. When the palm contacts the end of the stud 12, the retainer will have been properly positioned.

The removal of the retainer is accomplished simply by grasping the second end portion 58, squeezing the second end portion and lifting the retainer off the stud 12.

What we claim is:

1. A ball joint assembly including a socket member having a cavity, a threaded stud projecting through said socket member and having a head supported in said cavity, a dust cover surrounding said stud and provided with a seal between said stud and an outer surface of said socket member and a dust cover retainer fitted over said stud to hold said dust cover on said stud and protect the threads of said stud, said retainer comprising a one piece resilient plastic member of open ended generally tubular configuration, said retainer having a first end portion provided with a radially inwardly projecting rib engaging the threads of said stud and an opposite second end portion engaging said dust cover, said first end portion being longitudinally split into opposite halves which are movable toward and away from one another upon the application of radial forces to said second end portion.

2. The structure set forth in claim 1 in which said second end portion is outwardly flared whereby a force applied thereto longitudinally of said stud will result in a radially outward force thereon and tend to move the opposite halves of said first end portion toward one another.

3. The structure set forth in claim 2 wherein said second end portion is longitudinally split into opposite halves and said retainer has a pair of integral hinge portions located between said first and second end portions.

4. The structure set forth in claim 1 wherein said retainer comprises a unitary plastic mold of substantially frustoconical shape.

5. The structure set forth in claim 1 wherein said rib has the shape of a thread.

6. The structure set forth in claim 5 in which said thread shaped rib is formed in separate portions on each of said halves.

7. The structure set forth in claim 1 in which the free end of said first end portion will substantially align with the outer free end of said stud when said second end portion engages said dust cover.

8. The structure set forth in claim 1 in which said second end portion is provided with an outwardly flared skirt at the end thereof engaging said dust cover.